(12) United States Patent
Misak et al.

(10) Patent No.: US 10,071,439 B1
(45) Date of Patent: Sep. 11, 2018

(54) METHOD AND SYSTEM OF JOINING THICK SHEETS OF NON-WELDABLE MATERIAL USING ULTRASONIC JOINING

(71) Applicant: Spirit AeroSystems, Inc., Wichita, KS (US)

(72) Inventors: Heath Edward Misak, Wichita, KS (US); Paul R. Toivonen, Derby, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 0 days.

(21) Appl. No.: 15/717,197

(22) Filed: Sep. 27, 2017

(51) Int. Cl.
B23K 20/10 (2006.01)
B23K 33/00 (2006.01)
B23K 103/10 (2006.01)

(52) U.S. Cl.
CPC .............. B23K 20/10 (2013.01); B23K 33/00 (2013.01); *B23K 2203/10* (2013.01)

(58) Field of Classification Search
CPC ....... B23K 33/00; B23K 33/008; B23K 20/10
USPC ................................ 228/144, 147, 149, 151
See application file for complete search history.

(56) References Cited

U.S. PATENT DOCUMENTS

| | | | |
|---|---|---|---|
| 1,959,791 A * | 5/1934 | Kautz | B23K 33/004 219/137 R |
| 3,313,911 A * | 4/1967 | Seelofff | B23K 11/061 219/105 |
| 3,563,713 A * | 2/1971 | Rudd | B23K 20/085 228/107 |
| 5,148,966 A * | 9/1992 | Minase | B23K 31/02 228/149 |
| 5,227,609 A * | 7/1993 | Simon | B23K 9/02 219/137 R |
| 5,343,010 A * | 8/1994 | Urech | B23K 26/26 219/105 |
| 6,336,583 B1 * | 1/2002 | Wang | B23K 31/02 228/175 |
| 6,814,823 B1 * | 11/2004 | White | B23K 11/0013 156/73.1 |
| 2002/0014514 A1 * | 2/2002 | Shimizu | B23K 31/12 228/104 |
| 2007/0194085 A1 * | 8/2007 | Spinella | B23K 3/0607 228/101 |
| 2013/0129518 A1 * | 5/2013 | Hayden | F03D 1/0675 416/226 |
| 2014/0311654 A1 * | 10/2014 | Hansen | B29C 65/08 156/73.1 |

(Continued)

*Primary Examiner* — Erin B Saad
*Assistant Examiner* — Carlos J Gamino
(74) *Attorney, Agent, or Firm* — Hovey Williams LLP

(57) ABSTRACT

A method and system for joining relatively thick (i.e., at least 0.07 inch, or between 0.08 and 0.24 inch) sheets of non-weldable aluminum or other material using multiple passes of ultrasonic joining and multiple plugs to create a single larger sheet. Angles and profiles are machined onto edges of the sheets, the angles are overlapped to form a scarf joint, and ultrasonic joining is performed on both sides of the scarf joint, resulting in channels where the angles and profiles intersect. Plugs are extruded or otherwise created and positioned in the channels, and ultrasonic joining is used to join the plugs in the channels. Additional plugs are added until the last plugs are proud of the surface, and then the plugs are machined until the joint is flush with the surface. The plugs may be of the same or a different material as the sheets.

11 Claims, 3 Drawing Sheets

(56) References Cited

U.S. PATENT DOCUMENTS

2017/0001387 A1\* 1/2017 Ostergaard ............ B29C 70/342
2017/0342959 A1\* 11/2017 Hayden ................ F03D 1/0675

\* cited by examiner

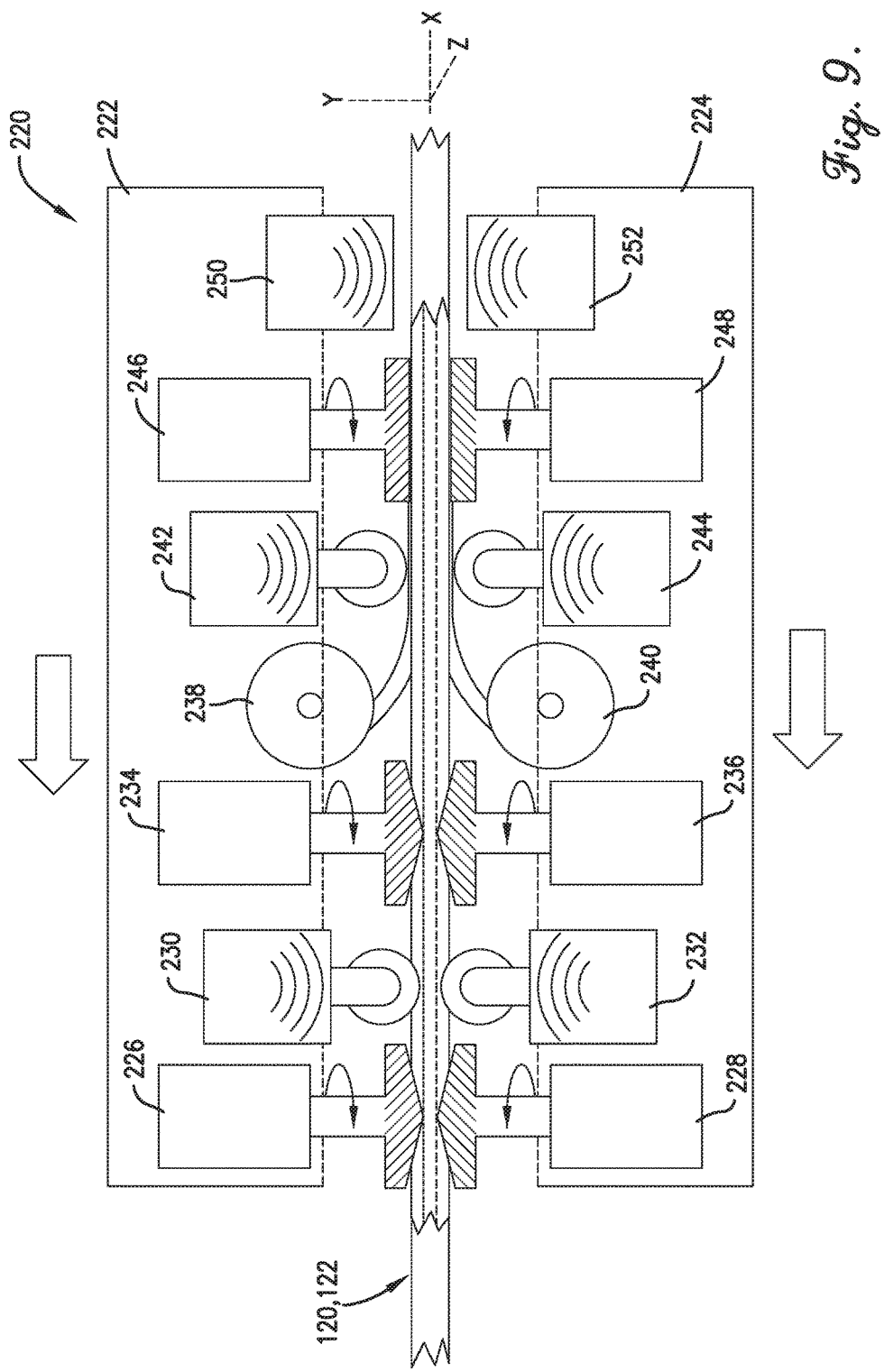

METHOD AND SYSTEM OF JOINING THICK SHEETS OF NON-WELDABLE MATERIAL USING ULTRASONIC JOINING

FIELD

The present invention relates to methods of joining sheets of non-weldable materials, and more particularly, embodiments concern a method of joining relatively thick sheets of non-weldable aluminum and other materials using multiple passes of ultrasonic joining and multiple plugs to create a single larger sheet.

BACKGROUND

In the manufacture of aircraft, ships, buildings, and other structures it is often desirable to use large sheets of aluminum or other materials for, e.g., exterior surfaces, or "skins." Using larger sheets rather than riveting together multiple smaller sheets both reduces the number of fasteners and improves the performance of the structure. However, suppliers of aluminum sheets are limited in the sizes they can produce by milling technology. Thus, there is a need to join aluminum sheets together with base material-like properties. Conventional welding is not suitable for use on high performance aluminum alloys (i.e., 2XXX and 7XXX) as it results in a joint having a heat-affected zone with changed heat treatment and corrosion issues. Friction stir welding can join aluminum, but it results in a stir zone with varying metallurgical properties, and it also creates a heat-affected zone that reduces performance.

Ultrasonic joining is a joining technique which causes dynamic recrystallization of new grains to form an interface. Ultrasonic joining can join aluminum but is limited in that the energy required to cause dynamic recrystallization must travel through the material, and as the material becomes thicker, the energy requirement increases exponentially. At some point, the energy required to cause the dynamic recrystallization damages the exterior, which imposes a limit on the thickness, approximately 0.04 inch, that can be joined. Some work has been done to successfully join sheets up to 0.07 inch thick by using ultrasonic joining on both sides of a scarf joint. However, ultrasonic joining has not been used to join sheets between 0.08 inch and 0.24 inch thick, which would be useful in the aircraft manufacturing industry.

This background discussion is intended to provide information related to the present invention which is not necessarily prior art.

SUMMARY

Embodiments address the above-described and other problems by providing a method of joining relatively thick sheets (i.e., at least 0.07 inch, or between 0.08 and 0.24 inch) of non-weldable aluminum using multiple passes of ultrasonic joining and multiple plugs to create a single larger sheet.

In a first embodiment of the present invention, a method is provided for joining first and second sheets of a non-weldable material having a thickness of at least 0.07 inch to create a single larger sheet having a first side and a second side. The method may broadly comprise the following. For each sheet of the first and second sheets, an angle may be cut on a first side of an edge of the sheet, and a profile may be machined on a second side of the edge of the sheet. The angles on the first sides of both sheets may be overlapped, and ultrasonic joining may be performed to join the first and second sheets together by a scarf joint to form the single larger sheet, such that the angle of each sheet intersects the profile of the other sheet to create a first channel in the first side and a second channel in the second side of the single larger sheet. For each channel of the first and second channels, at least one plug may be positioned in the channel, with the plug having a thickness of between 0.01 inch and 0.04 inch, and ultrasonic joining may be performed to join the plug in the channel. A last plug may be machined flush with the surface of the single larger sheet.

Various implementations of the first embodiment may include any one or more of the following additional features. The first and second sheets of the non-weldable material may each have a thickness of between 0.08 inch and 0.24 inch. The non-weldable material may be a non-weldable aluminum material. Each plug may be of a different non-weldable material than each sheet. For each channel, at least one additional plug may be positioned over an initial plug in the channel, and ultrasonic joining may be performed to join the additional plug in the channel until a last additional plug is proud of a surface of the single larger sheet. For each channel, the method may further include machining the initial plug ultrasonically joined in the channel in preparation for joining the additional plug over the initial plug. For each channel, there may be at least one intermediate additional plug prior to the last additional plug, and the method may further include machining the intermediate additional plug joined in the channel in preparation for joining the last additional plug over the intermediate additional plug. For each channel, positioning the plug in the channel may involve extruding and cutting the plug from a spool of stock material. The method may further include performing non-destructive inspection on the single larger sheet to determine one or more characteristics of the joining.

In a second embodiment of the present invention, a system is provided for joining first and second sheets of a non-weldable material having a thickness of at least 0.07 inch to create a single larger sheet having a first side and a second side. The system may broadly comprise, for each sheet of the first and second sheets, a cutting head, a first machining head, and a first ultrasonic joining head. The cutting head may be configured to cut an angle on a first side of an edge of the sheet so that the first and second sheets can be overlapped to form a scarf joint having first and second sides. The first machining head may be configured to machine a profile on a second side of the edge of the sheet. The first ultrasonic joining head may be configured to perform ultrasonic joining on the first and second sides of the scarf joint to join together the first and second sheets to form the single larger sheet, such that the angle of each sheet intersects the profile of the other sheet to create a first channel in the first side and a second channel in the second side of the single larger sheet. The system may further broadly comprise, for each channel of the first and second channels, a plug dispenser, a second ultrasonic joining head, and a second machining head. The plug dispenser may be configured to position at least one plug in the channel, with the plug having a thickness of between 0.01 inch and 0.04 inch. The second ultrasonic joining head may be configured to perform ultrasonic joining to join the plug in the channel. The second machining head may be configured to machine a last plug flush with the surface of the single larger sheet.

Various implementations of the second embodiment may include any one or more of the following additional features. The first and second sheets of the non-weldable material may each have a thickness of between 0.08 inch and 0.24 inch. The non-weldable material may be a non-weldable aluminum material. Each plug may be of a different non-weldable material than each sheet. For each channel, the plug dispenser may be further configured to position at least one additional plug over an initial plug in the channel, and the second ultrasonic joining head may be further configured to perform ultrasonic joining to join the at least one additional plug in the channel until a last additional plug is proud of the surface of the single larger sheet. For each channel, the system may further include, an intermediate machining head configured to machine the initial plug joined in the channel in preparation for joining the at least one additional plug over the initial plug. For each channel, there may be at least one intermediate additional plug prior to the last additional plug, and the system may further include an intermediate machining head configured to machine the intermediate additional plug joined in the channel in preparation for joining the last additional plug over the intermediate additional plug. For each channel, the plug dispenser may extrude and cut the plug from a spool of stock material. The system may further include a non-destructive inspection device configured to perform non-destructive inspection of the single larger sheet to determine one or more characteristics of the joining.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 9 is a diagram of a system for joining relatively thick sheets of non-weldable material using ultrasonic joining.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Broadly characterized, embodiments provide a method and system of joining relatively thick sheets of non-weldable aluminum and other materials using multiple passes of ultrasonic joining and multiple plugs to create a single larger sheet. In more detail, the method and system employs a multi-step process to overcome existing limitations on the thicknesses of materials amenable to ultrasonic joining, and allows for joining together sheets of non-weldable aluminum or other material having thicknesses of greater than 0.07 inch, or greater than 0.08 inch, or between 0.08 inch and 0.24 inch.

Figure 1:
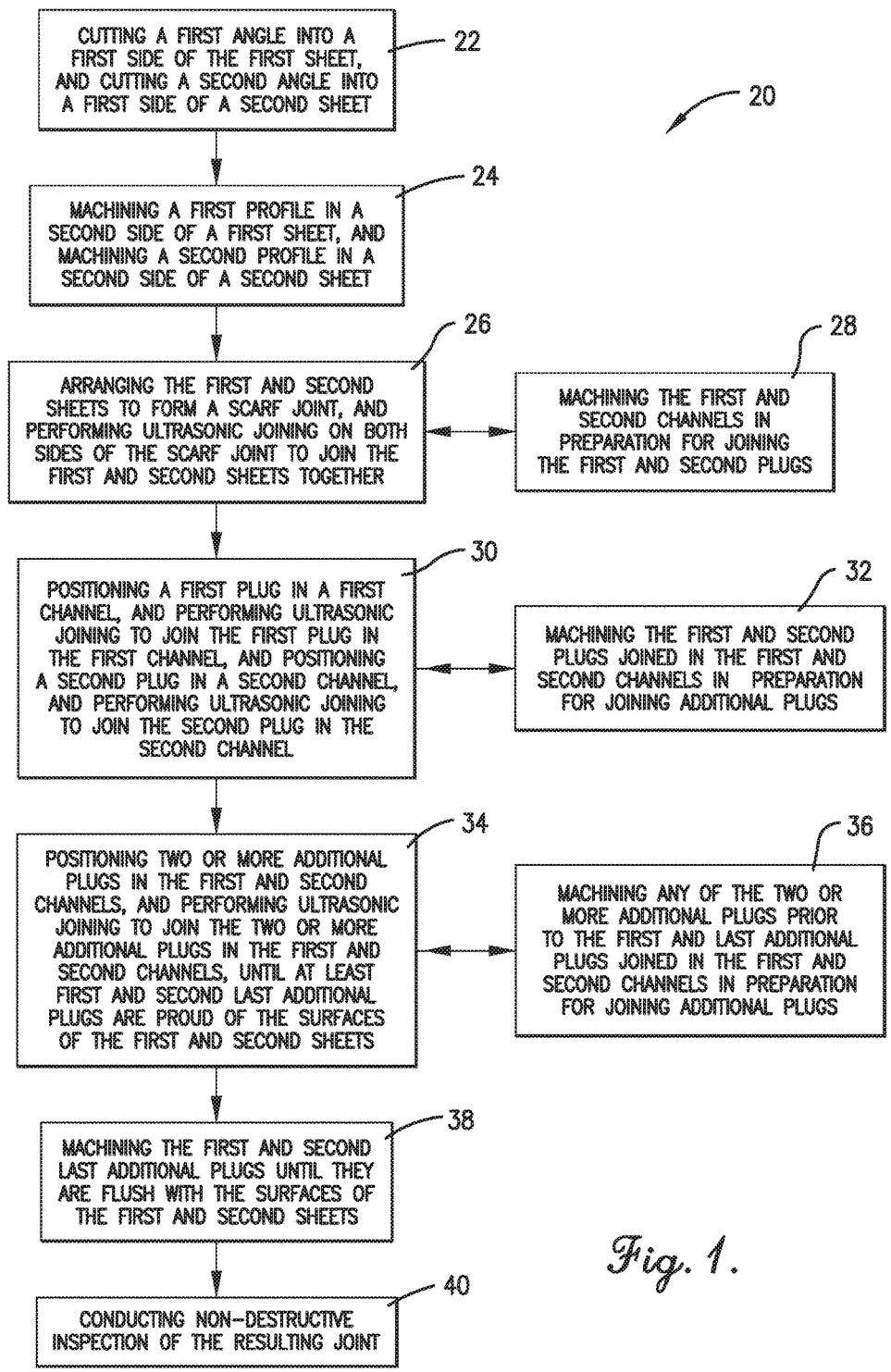
FIG. 1 is a flowchart of steps in an embodiment of a method of joining relatively thick sheets of non-weldable material using ultrasonic joining.
Figure 2:
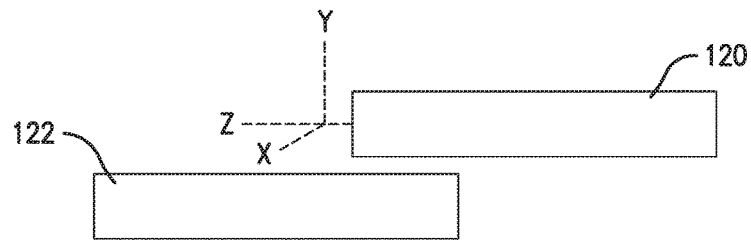
FIG. 2 is a fragmentary cross-sectional side elevation view of first and second sheets to be joined using the method of FIG. 1.

Referring to FIGS. 1 and 2-8, an embodiment of a method 20 of joining first and second relatively thick sheets of non-weldable aluminum or other material 120,122, as seen in FIG. 2, using ultrasonic joining is shown. The sheets 120,122 are shown having X, Y, and Z axes, with the sheets being joined along the X axis. The method 20 may broadly comprise the following.

Figure 3:
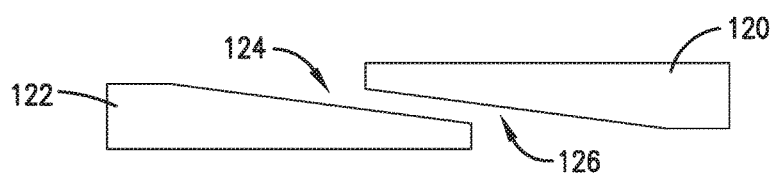
FIG. 3 is a fragmentary cross-sectional side elevation view of the result of an angle cutting step of the method of FIG. 1 on the sheets of FIG. 2.

A first angle 124 may be cut onto a first or inner side of an edge of the first sheet 120, and a second angle 126 may be cut onto a corresponding first or inner side of the second sheet 122, as shown in 22 and seen in FIG. 3. The purpose of the first and second angles 124,126 may be to facilitate forming a scarf joint, so the angles 124,126 may be substantially identical, and each angle 124,126 may be less than 45 degrees, or less than 20 degrees, though the actual slope may depend on such factors as the thickness of the sheets 120,122 and the ability of the ultrasonic joining to penetrate the material. In one implementation, the first and second angles 124,126 may have a substantially planar contour (as shown in the figures), while in another implementation, the first and second angles 124,126 may have a substantially non-planar contour, such as a curved or a stepped contour, or, more broadly, a simple or a complex contour.

Figure 4:
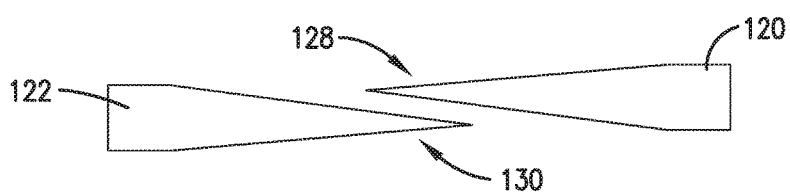
FIG. 4 is a fragmentary cross-sectional side elevation view of the result of a profile machining step of the method of FIG. 1.

A first profile 128 may be machined on a second or outer side of the edge of the first sheet 120, and a second profile 130 may be machined on a corresponding second or outer edge of the second sheet 122, as shown in 24 and seen in FIG. 4. The first and second profiles 128,130 may be substantially identical, and each profile 128,130 may be substantially angular and slope toward the edge of the sheet 120,122. In one implementation, the first and second profiles 128,130 may have a substantially planar contour (as shown in the figures), while in another implementation, the first and second profiles 128,130 may have a substantially non-planar contour, such as a curved or a stepped contour, or, more broadly, a simple or a complex contour.

Figure 5:
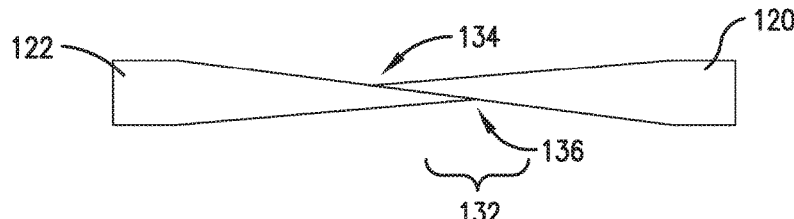
FIG. 5 is a fragmentary cross-sectional side elevation view of the result of an ultrasonic joining step of the method of FIG. 1.

The first and second sheets 120,122 may be arranged so that the first and second angles 124,126 overlap, forming a scarf joint 132, and ultrasonic joining may be performed on both sides of the scarf joint 132 to join the first and second sheets 120,122 together, as shown in 26 and seen in FIG. 5. On one side of the scarf joint 132, the first profile 128 may intersect the second angle 126 to form a first channel 134, while on the other side of the scarf joint 132, the second profile 130 may intersect the first angle 124 to form a second channel 136. As needed or desired, the first and second channels 134,136 may be machined in preparation for joining the first and second plugs, as shown in 28.

Figure 6:
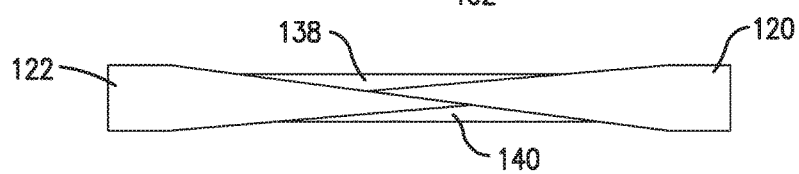
FIG. 6 is a fragmentary cross-sectional side elevation view of the result of an initial plug installation step of the method of FIG. 1.

A first plug 138 may be created and positioned in the first channel 134, and ultrasonic joining may be performed to join the first plug 138 in the first channel 134, and a second plug 140 may be created and positioned in the second channel 136, and ultrasonic joining may be performed to join the second plug 140 in the second channel 136, as shown in 30 and seen in FIG. 6. As needed or desired, the first and second plugs 138,140 ultrasonically joined in the first and second channels 134,136 may be machined in preparation for joining additional plugs, as shown in 32.

If the sheets 120,122 are not substantially thicker than 0.07 inch (i.e., not greater than 0.09 inch thick, or not greater than 0.08 inch thick), then only the first and second plugs 138,140 may be needed to complete the complete the joint. However, as needed or desired, two or more additional plugs 142,144 may be created and positioned in the first and second channels 134,136 over the previously installed plugs, and ultrasonic joining may be performed on the two or more additional plugs 142,144 to join the two or more additional plugs 142,144 in the first and second channels 134,136 until at least first and second last additional plugs are proud of the surfaces of the first and second sheets 120,122, as shown in 34 and seen in FIG. 7. As needed or desired, any of the two or more additional plugs 142,144 prior to the first and second last additional plugs ultrasonically joined in the first and second channels 134,136 may be machined in preparation for joining additional plugs, as shown in 36. At least the first and second last additional plugs (or as mentioned, the first and second plugs 138,140 if they are the only and therefore last plugs) may be machined until they are flush with the surfaces of the first and second sheets 120,122 (i.e., until the joint is the same thickness as the base material) to produce the finished joint 146, as shown in 38 and seen in FIG. 8.

The first and second plugs 138,140 and/or the two or more additional plugs 142,144 may each have a thickness of between 0.01 inch and 0.04 inch. The first and second plugs 138,140 and/or the two or more additional plugs 142,144 may be of the same or a different material as the sheets 120,122. For example, if the sheets 120,122 are a type of aluminum, then the plugs 138,140,142,144 may be the same or a different type of aluminum, or they may be steel or another body-centered cubic material, or they may be titanium or another hexagonal close-packed material. In one implementation, the plugs 138,140,142,144 may be of a tougher material than the sheets 120,122 in order to further resist cracking. The first and second plugs 138,140 may present inner surfaces having contours that engage or otherwise complement the contours of the angles 124,126 and/or profiles 128,130, and may present outer surfaces having contours that may be similarly planar or non-planar. Similarly, the two or more additional plugs 142,144 may present inner surfaces having contours that engage or otherwise complement the contours of the outer surfaces of the first and second plugs 124,126, and may present outer surfaces having contours that may be similarly planar or non-planar.

In one implementation, the plugs 138,140,142,144 may be dispensed as pre-formed plug material into the channels 134,136. In another implementation, the plugs 138,140,142,144 may be formed from plug material as they are dispensed into the channels 134,136. In the latter implementation, the plug material may be spooled wire other feedstock material.

At least the finished joint 146 or the resulting single larger sheet may be tested, evaluated, or otherwise inspected using a non-destructive inspection technique, as shown in 40, to determine whether the joint 146 is satisfactory for the intended purpose of the sheet.

Thus, the method 20 may be used to create relatively thick sheets of non-weldable aluminum of substantially any size.

Referring also to FIG. 9, an embodiment of a system 220 is shown for joining first and second relatively thick sheets of non-weldable aluminum or other material 120,122 using ultrasonic joining. The system 220 may implement some or all of the aspects of the method 20 described above, and the corresponding method steps are referenced in the following description of the system 220. The system 220 may broadly comprise first and second end effectors 222,224, with each end effector including a first machining head 226,228; a first ultrasonic joining head 230,232; a second machining head 234,236; a plug dispenser 238,240; a second ultrasonic joining head 242,244; a third machining head 246,248; and first and second NDI devices 250,252.

The first and second end effectors 222,224 may be moveable along the length of the edges (i.e., the X axis) of the sheets of material 120,122 to be joined. The end effectors 222,224 may be moved by robotic devices. In an alternative implementation, the sheets 120,122 may be moved relative to the end effectors 222,224 which may remain stationary. The first end effector 222 may be positioned and configured to act on a first side of the sheets 120,122, and the second end effector 224 may be positioned and configured opposite the first end effector 222 and configured to act on a second side of the sheets 120,122. The second end effector 224 may be further configured to react to loads created by the first end effector 222.

As illustrated, prior to the sheets 120,122 entering the system 220, a first angle 124 may be cut onto a first or inner side of an edge of the first sheet 120, and a second angle 126 may be cut onto a corresponding first or inner side of the second sheet 122 (corresponding to step 22 of FIG. 1, and seen in FIG. 3), in order to facilitate forming a scarf joint. Alternatively, the system 220 may include first and second cutting heads configured to cut the angles 124,126.

The first machining heads 226,228 may be configured to machine a first profile 128 on a second or outer side of the edge of the first sheet 120, and to machine a second profile 130 on a corresponding second or outer edge of the second sheet 122 (corresponding to step 24, and seen in FIG. 4).

The first and second sheets 120,122 may be arranged so that the first and second angles 124,126 overlap, forming a scarf joint 132, and the first ultrasonic joining head 230,232 may be configured to perform ultrasonic joining on both sides of the this scarf joint 132 to join the first and second sheets 120,122 together (corresponding to step 26, and seen in FIG. 5). On one side of the scarf joint 132, the first profile 128 may intersect the second angle 126 to form a first channel 134, while on the other side of the scarf joint 132, the second profile 130 may intersect the first angle 124 to form a second channel 136. As needed or desired, the second machining head 234,236 may be configured to machine the first and second channels 134,136 in preparation for joining the first and second plugs (corresponding to step 28).

The plug dispenser 238,240 may position a first plug 138 in the first channel 134, and may position a second plug 140 in the second channel 136 (corresponding to a first part of step 30, and seen in FIG. 6). In one implementation, the dispenser 238,240 may dispense pre-formed plug material into the channels 134,136. In another implementation, the dispenser 238,240 may form the plug material as it is dispensed. In the latter implementation, plug material may be in the form of spooled wire or other feedstock.

The second ultrasonic joining head 242,244 may be configured to perform ultrasonic joining to join the first plug 138 in the first channel 134, and the second plug 140 in the second channel 136 (corresponding to a second part of step 30, and seen in FIG. 6). As needed or desired, the second machining head 234,236 may be configured to machine the first and second plugs 138,140 in preparation for joining additional plugs (corresponding to step 32).

Figure 7:
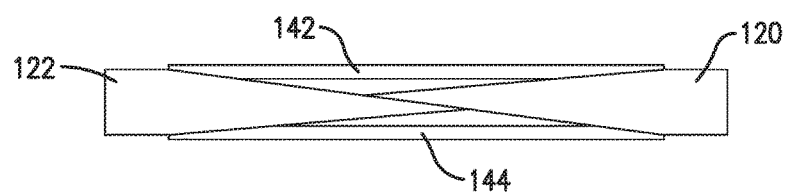
FIG. 7 is a fragmentary cross-sectional side elevation view of the result of a final plug installation step of the method of FIG. 1.

As needed or desired, the plug dispenser 238,240 may position two or more additional plugs 142,144 in the first and second channels 134,136 over the previously installed plugs, and the second ultrasonic joining head 242,244 may perform ultrasonic joining to join the two or more additional plugs 142,144 in the first and second channels 134,136 until at least first and second last additional plugs are proud of the surfaces of the first and second sheets 120,122 (corresponding to step 34, and seen in FIG. 7. As needed or desired, the second machining head 234,236 may be configured to machine any two or more additional plugs 142,144 prior to the first and second last additional plugs ultrasonically joined in the first and second channels 134,136 in preparation for joining additional plugs (corresponding to step 36).

Figure 8:
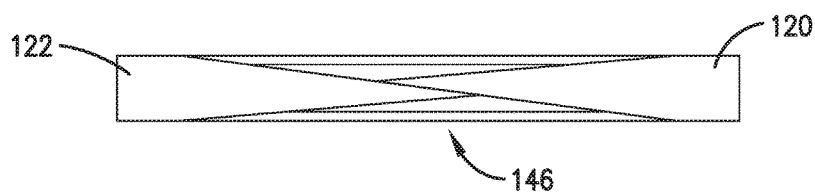
FIG. 8 is a fragmentary cross-sectional side elevation view of the result of a final machining step of the method of FIG. 1, showing the finished joint.

The third machining head 246,248 may be configured to machine at least the first and second last additional plugs until they are flush with the surfaces of the first and second sheets 120,122 (i.e., until the joint is the same thickness as the base material) to produce the finished joint 146 (corresponding to step 38, and seen in FIG. 8).

The NDI device 250 may be configured to test, evaluate, or otherwise inspect at least the finished joint 146 of the resulting single larger sheet using a non-destructive inspection technique (corresponding to step 40), to determine whether the joint 146 is satisfactory for the intended purpose of the sheet.

Thus, the system 220 may be used to create relatively thick sheets of non-weldable aluminum of substantially any size.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A method of joining first and second sheets of a material having a thickness of at least 0.07 inch to create a single larger sheet having a first side and a second side, the method comprising:
    for each sheet of the first and second sheets—
        cutting an angle on a first side of an edge of the sheet, and
        machining a profile in a second side of the edge of the sheet;
    overlapping the angles on the first sides of both sheets, and performing ultrasonic joining to join the first and second sheets together by a scarf joint to form the single larger sheet, such that the angle of each sheet intersects the profile of the other sheet to create a first channel in the first side and a second channel in the second side of the single larger sheet; and
    for each channel of the first and second channels—
        positioning at least one plug in the channel, with the plug having a thickness of between 0.01 inch and 0.04 inch, and performing ultrasonic joining to join the plug in the channel, and
        machining a last plug of the at least one plug flush with the respective side of the single larger sheet.

2. The method of claim 1, wherein the first and second sheets of the non-weldable material each have a thickness of between 0.08 inch and 0.24 inch.

3. The method of claim 1, wherein the material is an aluminum material.

4. The method of claim 1, wherein each plug is of a different material than each sheet.

5. The method of claim 1, further including, for each channel of the first and second channels, positioning at least one additional plug over an initial plug in the channel, and performing ultrasonic joining to join each additional plug in the channel until the last plug is proud of a surface of the single larger sheet.

6. The method of claim 5, further including, for each channel of the first and second channels, machining the initial plug ultrasonically joined in the channel in preparation for joining the additional plug over the initial plug.

7. The method of claim 6, wherein, for each channel of the first and second channels, there is at least one intermediate additional plug prior to the last plug, and further including, for each channel of the first and second channels, machining the intermediate additional plug joined in the channel in preparation for joining the last plug over the intermediate additional plug.

8. The method of claim 1, wherein, for each channel of the first and second channels, positioning the at least one plug in the channel involves extruding and cutting the plug from a spool of stock material.

9. The method of claim 1, further including performing non-destructive inspection on the single larger sheet to determine one or more characteristics of the joining.

10. A method of joining first and second sheets of an aluminum material having a thickness of between 0.08 inch and 0.24 inch to create a single larger sheet having a first side and a second side, the method comprising:
    for each sheet of the first and second sheets—
        cutting an angle on a first side of an edge of the sheet, and
        machining a profile in a second side of the edge of the sheet;
    overlapping the angles on the first sides of both sheets, and performing ultrasonic joining to join the first and second sheets together by a scarf joint to form the single larger sheet, such that the angle of each sheet intersects the profile of the other sheet to create a first channel in the first side and a second channel in the second side of the single larger sheet;
    for each channel of the first and second channels—
        adding plugs until at least one of the plugs is proud of the respective side of the larger single sheet, wherein the adding of the plugs comprises-
            positioning an initial plug in the channel, with the initial plug having a thickness of between 0.01 inch and 0.04 inch, and performing ultrasonic joining to join the initial plug in the channel, positioning at least one additional plug over the initial plug in the channel, and performing ultrasonic joining to join the additional plug in the channel, and machining a last additional plug flush with the respective side of the single larger sheet; and performing non-destructive inspection on the single larger sheet to determine one or more characteristics of the joining.

11. The method of claim 10, wherein, for each channel of the first and second channels, positioning the initial plug and the at least one additional plug in the channel involves extruding and cutting the initial plug and the at least one additional plug from a spool of stock material.

* * * * *